(12) United States Patent
Murai (10) Patent No.: US 9,155,161 B2
(45) Date of Patent: Oct. 6, 2015

(54) LIGHT SOURCE DEVICE AND PROJECTION DEVICE INCLUDING THE LIGHT SOURCE DEVICE

(71) Applicant: Toshiharu Murai, Kanagawa (JP)

(72) Inventor: Toshiharu Murai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 190 days.

(21) Appl. No.: 13/753,735

(22) Filed: Jan. 30, 2013

(65) Prior Publication Data

US 2013/0201408 A1 Aug. 8, 2013

(30) Foreign Application Priority Data

Feb. 3, 2012 (JP) ................. 2012-022048

(51) Int. Cl.
*G03B 21/20* (2006.01)
*H04N 9/31* (2006.01)
*H05B 37/02* (2006.01)

(52) U.S. Cl.
CPC .............. *H05B 37/02* (2013.01); *G03B 21/204* (2013.01); *G03B 21/2033* (2013.01); *G03B 21/2053* (2013.01); *H04N 9/31* (2013.01); *H04N 9/3111* (2013.01); *H04N 9/3161* (2013.01)

(58) Field of Classification Search
CPC ............. G03B 21/2033; G03B 21/204; G03B 21/2013; H04N 9/31; H04N 9/3111; H04N 9/3161; H04N 5/7458; H04N 9/315; H04N 9/3164; G02B 26/008; G11B 7/126
USPC ...................... 353/85; 348/744; 315/312, 153; 372/29.014
See application file for complete search history.

(56) References Cited

U.S. PATENT DOCUMENTS

| | | | |
|---|---|---|---|
| 2005/0073845 A1* | 4/2005 | Matsui | ........................... 362/293 |
| 2006/0279710 A1 | 12/2006 | Tani | |
| 2008/0042578 A1 | 2/2008 | Arai et al. | |
| 2010/0328627 A1* | 12/2010 | Miyazaki | ........................ 353/85 |
| 2010/0328628 A1 | 12/2010 | Masuda | |
| 2011/0043764 A1 | 2/2011 | Narikawa | |

(Continued)

FOREIGN PATENT DOCUMENTS

| | | |
|---|---|---|
| CN | 101071259 A | 11/2007 |
| CN | 101937164 A | 1/2011 |
| CN | 101995749 A | 3/2011 |

(Continued)

OTHER PUBLICATIONS

Chinese Office Action dated Sep. 29, 2014 issued in corresponding Chinese Application No. 201310158974.8 (with English translation).

(Continued)

*Primary Examiner* — William C Dowling
*Assistant Examiner* — Magda Cruz
(74) *Attorney, Agent, or Firm* — Harness, Dickey & Pierce, P.L.C.

(57) ABSTRACT

A light source device includes an LD module having a plurality of small light sources such as LDs, a control device selectively controlling On/Off of a plurality of the LDs, a first optical system collecting light emitted from the LDs into one collected light, and a second optical system emitting the collected light directly or through an optical process as source light. The control device maintains a constant amount of luminescence of the light source by controlling a number of the LDs selectively turned on in order to achieve a simple configuration of the light source device and a proper gradation expression of images.

11 Claims, 9 Drawing Sheets

(56) References Cited

U.S. PATENT DOCUMENTS

| | | | |
|---|---|---|---|
| 2011/0075103 A1* | 3/2011 | Ogawa et al. | 353/31 |
| 2011/0242496 A1 | 10/2011 | Kimoto et al. | |
| 2013/0293850 A1 | 11/2013 | Masuda | |

FOREIGN PATENT DOCUMENTS

| | | |
|---|---|---|
| JP | 2006-349731 | 12/2006 |
| JP | 2009-271406 A | 11/2009 |
| JP | 2010-085725 | 4/2010 |
| JP | 2011-221060 A | 11/2011 |

OTHER PUBLICATIONS

Chinese Office Action dated May 15, 2015 issued in corresponding Chinese Application No. 201310158974.8.

* cited by examiner

| tn | Di | LDD1 | LDD2 | LDD3 | LDD4 |
|----|----|------|------|------|------|
| t0 | 9  | 1 | 0 | 0 | 1 |
| t1 | 10 | 1 | 0 | 1 | 0 |
| t2 | 11 | 1 | 0 | 1 | 1 |
| t3 | 12 | 1 | 1 | 0 | 0 |
| t4 | 13 | 1 | 1 | 0 | 1 |
| t5 | 14 | 1 | 1 | 1 | 0 |
| t6 | 15 | 1 | 1 | 1 | 1 |

LIGHT SOURCE DEVICE AND PROJECTION DEVICE INCLUDING THE LIGHT SOURCE DEVICE

CROSS-REFERENCE TO RELATED APPLICATION

The present application is based on and claims priority from Japanese Application Number, 2012-022048 filed on Feb. 3, 2012, the disclosure of which is hereby incorporated by reference herein in its entirety.

BACKGROUND OF THE INVENTION

1. Field of the Invention

The present invention relates to a light source device and a field-sequential-type projection device including the light source device.

2. Description of the Related Art

Recently, display-devices having a large screen have become rapidly widespread, and it is common to use these displays in conferences, presentations, training and so on.

As display-devices for the above-mentioned purpose, there are various devices such as liquid-crystal type displays and plasma type displays. The displays are suitably chosen according to the size of venue or turnout. In particular, projection devices (hereinafter referred to as "projector") are the most prevalent large-screen display-devices because of their relative inexpensiveness and portability (i.e. they are light, compact and easy to carry).

Under such circumstances, recently, situations calling for communication have been increasing, and for example, conferences and meetings using a projector in a small conference room or a partitioned meeting space have been held frequently in many offices.

Moreover, situations arise where a meeting needs to be held at short notice in, for example, an unused space such as a passage if no meeting room is available, and information needs to be projected on to a wall and so on with a projector.

As a representative example of the projector, there is a field-sequential type projector represented by a DLP (Digital Light Processing) type projector. In the DLP type projectors, a display element such as a Digital Micromirror Device (DMD) achieves a gradation expression with modulation of a source light by high-speed switching of the angle of micromirrors of each pixel arranged in a matrix corresponding to an image data by use of PWM (Pulse Width Modulation) driving.

There are advantages in that these DLP type projectors are capable of being easily downsized and displaying each color, R(Red), G(Green) and B(Blue) sequentially by switching in time since the DMD is capable of high-speed motion.

On the other hand, conventionally, a main light source used for the projector is a high-intensity discharge lamp such as an extra high pressure mercury lamp. However, recently, products using the following as a light source have been launched onto the market: a solid-state light-emitting element such as an LED and an LD of red, green and blue or a fluorescent body emitting light of a different wavelength band from the light emitted from the solid-state light-emitting element as excitation light.

The solid-state light-emitting element has the advantage of being convenient in that there is no need for a cooling period after power-OFF like with a conventional lamp and it emits light of proper luminance immediately after power-ON.

Furthermore, the solid-state light-emitting element is considered to be environmentally friendly because it does not use mercury.

However, the amount of luminescence of the solid-state light-emitting element and the fluorescent body vary depending on the temperature, and in general, decrease with an increase in temperature. That is to say, solid-state light-emitting elements decrease the amount of luminescence from the start of energization by heat generation of themselves even if a constant electric current is supplied as a common driving method, and the amount of luminescence becomes stable when the solid-state light-emitting elements become thermally-stable.

The fluorescent body, which produces fluorescence by irradiation of the excitation light, also decreases the amount of luminescence by heat generation of itself even if constant excitation light is irradiated, and the amount of luminescence becomes stable when the fluorescent body is thermally stable.

Thus, when the solid-state light-emitting element or the fluorescent body is applied to the DLP type projector mentioned above, there has been a problem in that a gradation expression cannot be performed properly due to the amount of luminescence varying with driving by the common method as seen above even though the amount of luminescence of the light source must be constant for achieving the gradation expression by PWM driving.

Therefore, for example, Japanese Patent Application Publication No. 2006-349731 (Patent Literature 1) and Japanese Patent Application Publication No. 2010-085725 (Patent Literature 2) seek to solve the problem mentioned above.

In Patent Literature 1, a device to finely control the amount of current passing through the light-emitting element to keep the amount of luminescence of the solid-state light-emitting element constant is disclosed.

Further, in Patent Literature 2, a device to measure a level of an actual gradation relative to an original gradation signal and to convert the original gradation signal for adjusting to the actual gradation is disclosed.

SUMMARY OF THE INVENTION

However, in the conventional device such as in Patent Literature 1, because a driving current must be controlled quickly, there is a problem in that a driving circuit has a complicated configuration and hence a production cost of the device is expensive.

Further, in the conventional device such as in Patent Literature 2, because the levels of the gradation capable of displaying are decreased, there is a problem in that it is not possible to compensate to the proper gradation in principle.

Therefore, it is desirable to maintain the amount of luminescence of a light source constant in order to simplify a configuration of the device and achieve the proper gradation expression of an image.

The present invention is made in view of the above, and an object thereof is to provide a light source device and a projector having a simple configuration and capable of maintaining a constant amount of luminescence in order to achieve a proper gradation expression of an image.

The present invention is a light source device including a plurality of small light sources, a light source control device selectively controlling on/off of the emission from the plurality of small light sources, a first optical system that collects the light emitted from the small light sources into collected light, and a second optical system that emits the collected light directly or after an optical-processing as a source light.

The light source control device controls the amount of emission of the source light with the number of the small light sources selectively turned on.

According to the present invention, it is possible to maintain the amount of luminescence of a light source constant in order to simplify a configuration of the device and achieve the proper gradation expression of an image. Consequently, a low-cost and high-performance light source device without requiring a high-speed driving circuit can be achieved.

DETAILED DESCRIPTION OF THE PREFERRED EMBODIMENTS

Figure 1:
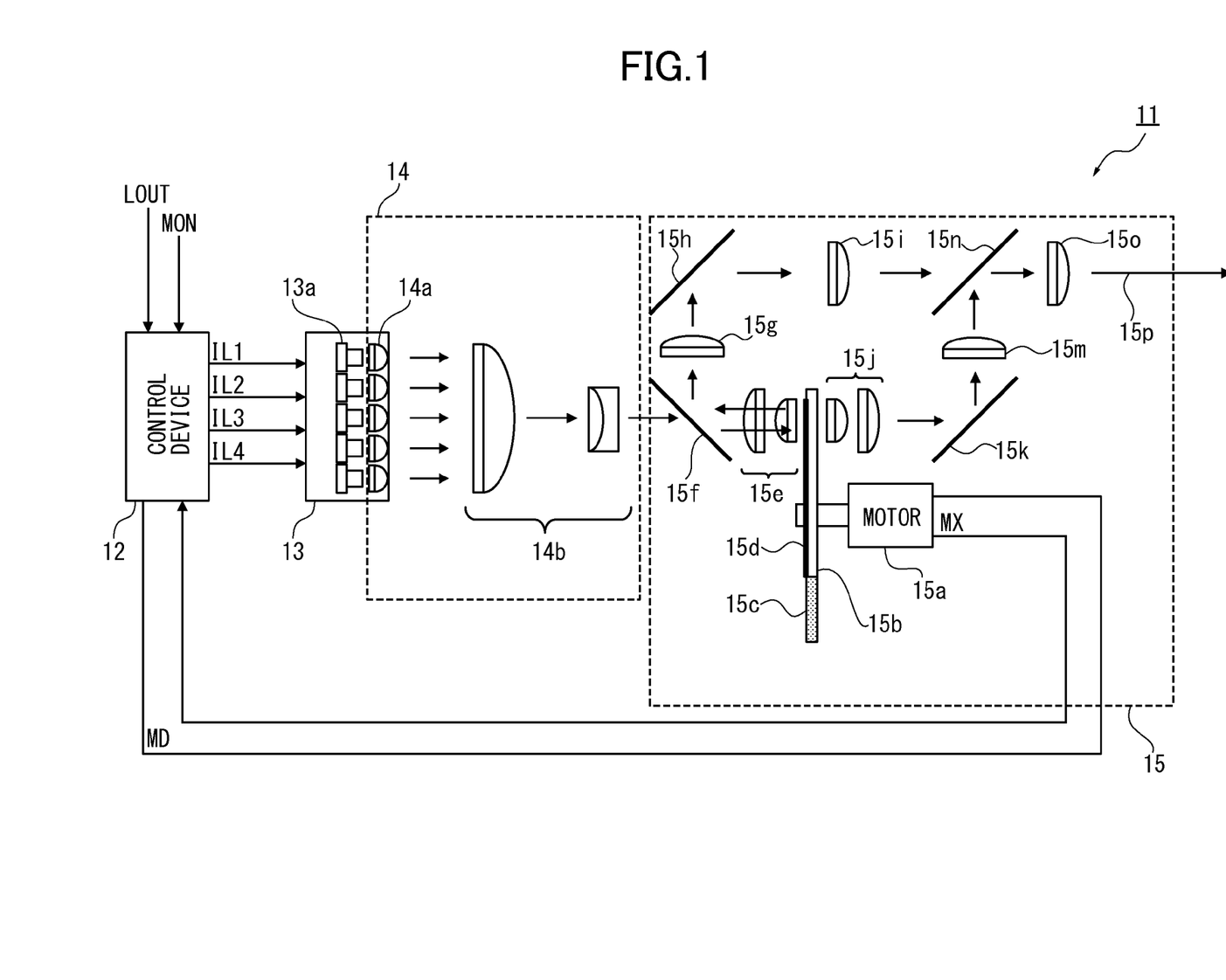
FIG. 1 is a block diagram illustrating the configuration of a light source device of a first embodiment according to the present invention.

Embodiments of the present invention will be described hereinafter with reference to the accompanying drawings.
<First Embodiment>
FIG. 1 is a block diagram illustrating the configuration of a light source device according to a first embodiment of the present invention.

A light source device 11 includes a control device 12, an LD module 13, a first optical system 14, and a second optical system 15.

The control device 12 outputs LD-drive current IL1 to IL4 in synchronization with an incoming control signal LOUT and an index signal MX from a motor 15a. The control device 12 starts the driving of the motor 15a by outputting a motor-driving signal MD in response to an incoming control signal MON.

The motor 15a outputs the index signal MX synchronized with a rotation of the wheel 15b attached to a rotating shaft, simultaneously with rotating the wheel.

Specifically, in FIG. 1, the control device 12 to control the light source starts driving of the motor 15a by outputting the motor-driving signal MD when a control signal MON is affirmed (e.g. being a level "H").

The motor 15a outputs the index signal MX synchronized with the rotation of the wheel 15b attached to the rotating shaft, simultaneously whilst rotating the wheel.

The control device 12 outputs the LD-drive current IL1 to IL4 in synchronization with the index signal MX when the control signal LOUT is affirmed (e.g. being the level "H").

The LD module 13 includes a plurality (n) of laser diodes (LD) 13a as small light sources and also has a function as a heat sink releasing heat generated in LD-13a to LD-13n.

Note that a light-emitting diode (LED) module having a plurality of LEDs may be substituted for the LD module 13.

As stated above, using LDs or LEDs for the small light sources enables a compact and reliable light source device to be achieved.

Furthermore, the generation of glare on a screen called speckle noise can be inhibited and an image quality is kept from deteriorating since a directionality of the LD-light can be reduced by using the LDs as the light sources and light emitted from the LD is not emitted directly.

Collimator lenses 14a and the LDs 13a are integrally mounted on the LD module 13 in order to facilitate the mounting of the collimator lenses 14a mounted on the first optical system 14 and the LDs 13a while keeping the accuracy of their location.

Figure 2:
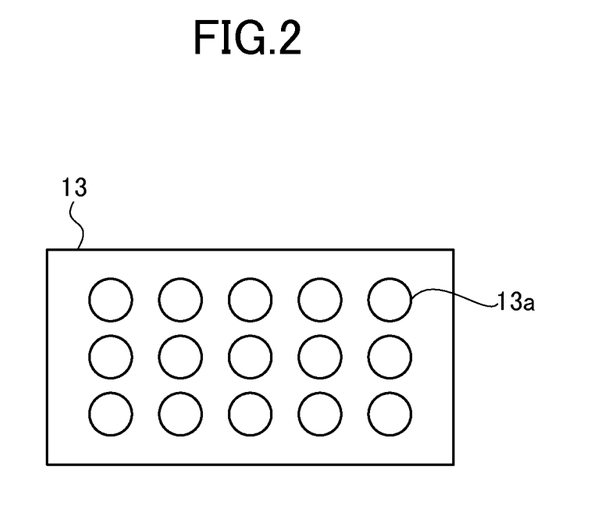
FIG. 2 illustrates that a plurality of LDs mounted on an LD module 13 shown in FIG. 1 are arranged in a matrix pattern.

The plurality of LDs 13a mounted on the LD module 13 are arranged in a matrix pattern, e.g., shown in FIG. 2. Note that, although the number of the LDs 13a is fifteen in this embodiment, it is not limited to this number.

Each LD 13a is selectively driven by the drive-current IL1 to IL4 and emits, e.g., blue light.

Each LD 13a mounted on the LD module 13 includes a corresponding collimator lens 14a-1 to 14a-n respectively and each of the collimator lenses collimates the light emitted from the LD. The light emitted from each LD and collimated is collected into one light beam by a collecting lens system 14b and further focused narrowly by a collecting lens system 15e after passing through a dichroic mirror 15f and irradiated to the wheel 15b.

Here, the dichroic mirror 15f has a characteristic that transmits light in a blue region of the LD-light and reflects light in a region that is equal to or longer than green.

Figure 3:
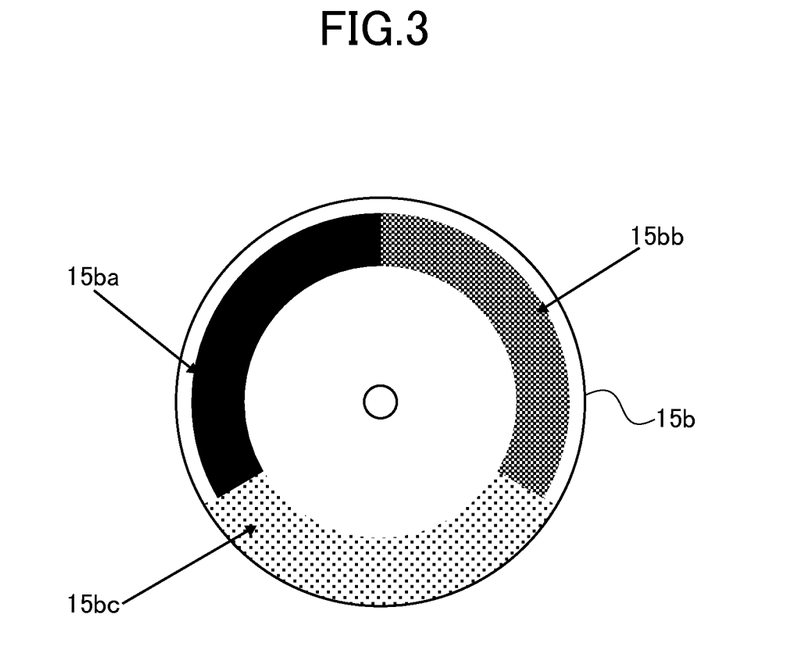
FIG. 3 is a schematic view of an example of a wheel 15b shown in FIG. 1.

FIG. 3 is a schematic view of an example of the wheel 15b.

In this embodiment, the wheel 15b is divided into 3 areas of an area A (15ba), an area B (15bb), and an area C (15bc) in a rotational direction.

In the area A (15ba) and the area B (15bb), fluorescent body layers 15d (see FIG. 1) having characteristics different from each other are formed on the reflective-coated base.

For example, when irradiated with the LD-light acting as exciting light, a fluorescent body A in the area A (15ba) emits green light of a different wavelength band from the LD-light. Likewise, when irradiated with the LD-light acting as exciting light, a fluorescent body B in the area B (15bb) emits red light of a different wavelength band from the LD-light.

In this way, low-cost and high-powered green and red lights that are difficult to achieve by use of only solid-state light-emitting elements can be easily afforded by irradiation of the collected light emitted from the plurality of small light sources to the fluorescent body.

On the other hand, the area C (15bc) consists of a diffusion member 15c (see FIG. 1) to transmit the LD-light whilst reducing the directionality of the light.

In this way, the LDs are used as the plurality of small light sources, and the light collected from the small light sources is emitted after passing through the diffusion member. Consequently, a safe light source device can be achieved that does not do any serious damage to human eyes even if the light is incident on the human eyes. Furthermore, image quality without the glare on the screen called speckle noise can be achieved by use of the light source device for the projector.

As FIG. 1 shows, green or red fluorescent light emitted from the fluorescent body A or B is reflected by the base and emitted to the side of the dichroic mirror 15f after passing through the collecting lens system 15e. Next, these lights are reflected by the dichroic mirror 15f as described above.

The green or red fluorescent light reflected by the dichroic mirror 15f is led to a dichroic mirror 15n via a relay lens system 15g, 15i, and a reflecting mirror 15h.

On the other hand, the LD-light transmitted through the area C (15bc) of the wheel 15b is led to the dichroic mirror 15n via a reflecting mirror 15k and a relay lens system 15m after collecting by a collecting lens system 15j.

The dichroic mirror 15n combines these lights into a single light path by transmitting green or red fluorescent light and reflecting blue LD-light. Then, the dichroic mirror 15n emits the combined light as a source light 15p after passing through a collecting lens system 15o.

Figure 4:
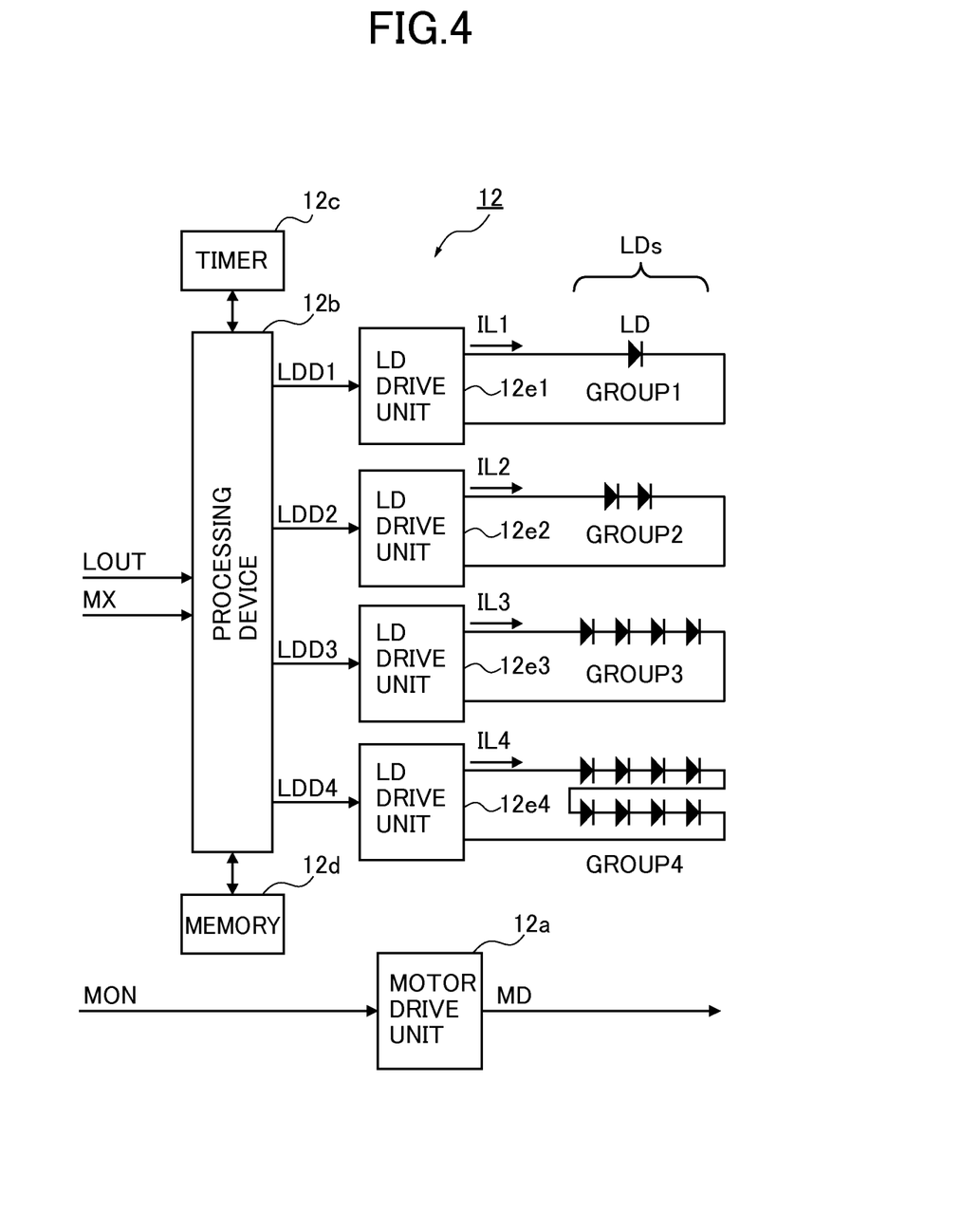
FIG. 4 illustrates an example of the configuration of the control device 12 and an example of the wiring of the LD mounted on the LD module 13 shown in FIG. 1.
Figure 5:
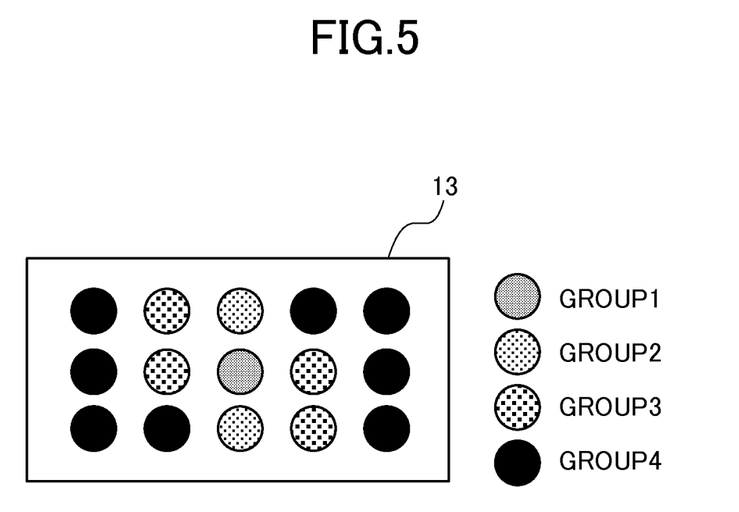
FIG. 5 illustrates an example of the arrangement of the LD module 13 shown in FIG. 1.
Figure 6:
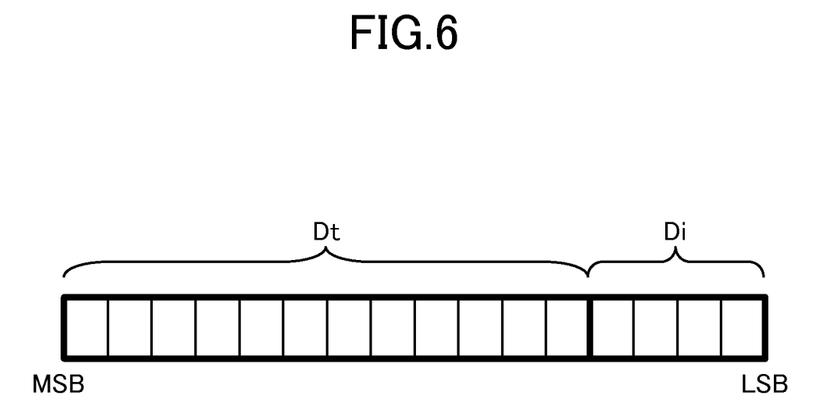
FIG. 6 illustrates an example of the data formation of control information used in the control device 12 shown in FIG. 1.
Figure 7:
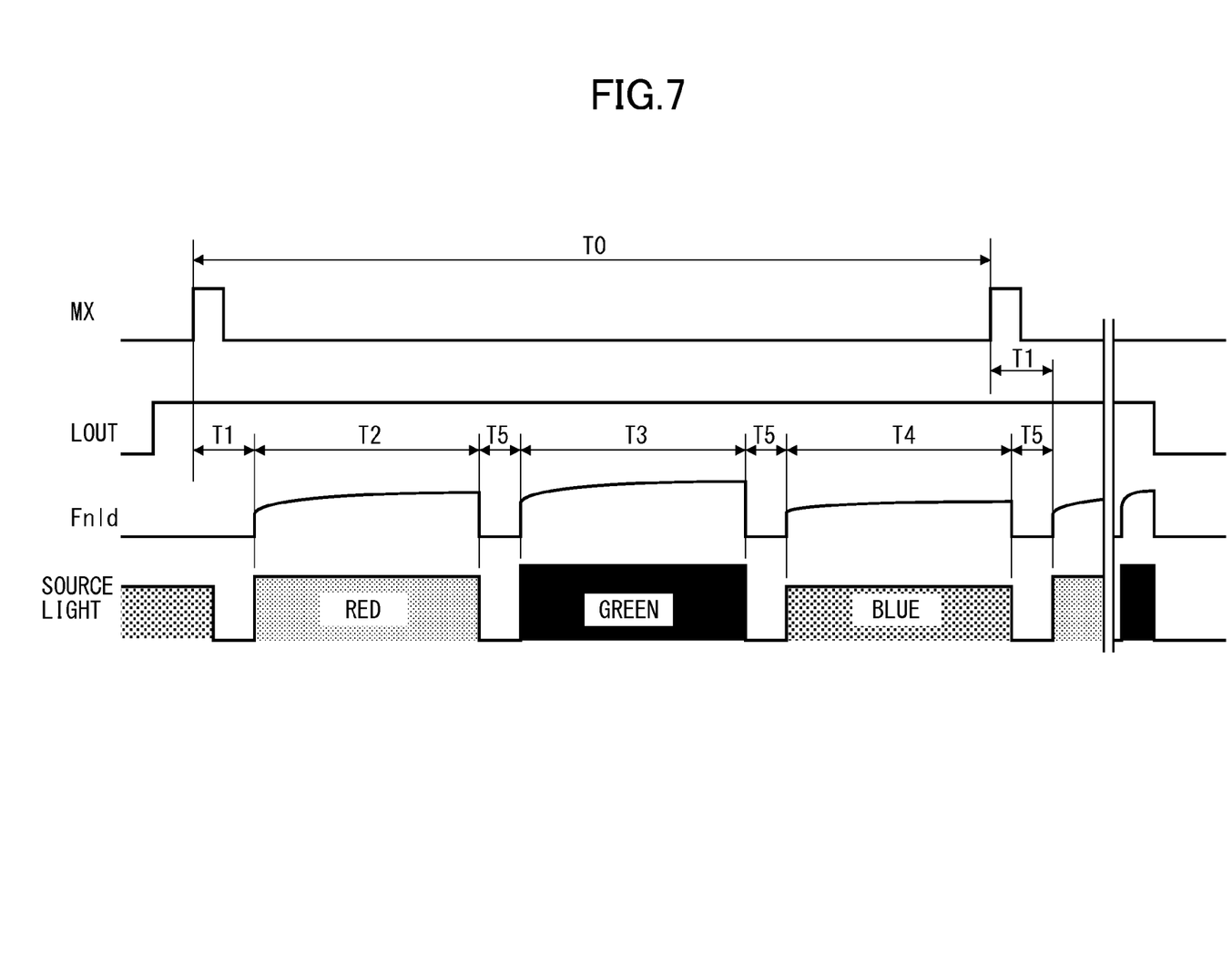
FIG. 7 is a timing diagram illustrating an example of a performance of the light source device in a configuration shown in FIG. 4.

FIGS. 4 to 7 schematically illustrate the configuration of the control device 12 shown in FIG. 1 and an example of a driving method of the LDs. FIG. 4 illustrates an example of the configuration of the control device 12 and an example of the wiring of the LDs mounted on the LD module 13. FIG. 5 illustrates an example of the arrangement of the LDs on the LD module 13 wired as shown in FIG. 4. FIG. 6 illustrates an example of data formation of control information. And, FIG. 7 is a timing diagram illustrating an example of a performance of the light source device in the configuration shown in FIG. 4.

In FIG. 4, at first, a motor drive unit 12a starts the driving of the motor by outputting the motor-driving signal MD when the motor-control signal MON becomes "H".

A processing device 12b enters a state capable of receiving the control signal LOUT (referred to as "standby mode") when detecting that the motor 15a has reached a predetermined speed of revolution by receiving the index signal MX from the motor 15a.

The processing device 12b waits for reception of a signal representing a predetermined transition of the index signal MX, for example, a transition from "L" to "H" when the control signal LOUT becomes "H" in the standby mode. Then, once the transition is detected, the processing device 12b actuates a timer 12c and starts reading the control information of LD from a memory 12d.

Now, the control information of the LDs is a 16-bit configuration, for example, as shown in FIG. 6, wherein 12-bit on the MSB (most significant bit) side shows elapsed time data Dt from the beginning of reading and 4-bit on the LSB (least significant bit) side shows LD-driving data Di corresponding to the elapsed time data Dt.

After the timer 12c has started up, the processing device 12b firstly begins to read the control information that has the smallest value of Dt from the memory 12d as a default position, and outputs LD-drive signals LDD1 to LDD4 based on a value of the LD-driving data Di corresponding to the Dt value.

Afterwards, the processing device 12b reads the control information that has a next smallest Dt value and stores the information in an internal register (not shown), and compares the Dt value with the elapsed time on the timer 12c. The processing device 12b keeps outputting the LD-drive signals LDD1 to LDD4 based on the Di value of the last control information until the Dt value coincides with the elapsed time on the timer 12c. Once the Dt value coincides with the elapsed time on the timer 12c, the processing device 12b changes the output of the LD-drive signals LDD1 to LDD4 to the output based on the data Di of the control information currently stored in the internal register. Furthermore, the processing device 12b repeats a process of reading the control information that has the next smallest Dt value from the memory 12d and performing as before.

In this way, a constant amount of luminescence of the source light is maintained from the beginning of emitting. Therefore, a high-performance light source device wherein the light intensity is stable from the beginning of emitting can be achieved. The constant amount of luminescence of the source light is maintained from the beginning of emitting by reading the control information, which is how to control the plurality of small light sources, previously stored in the memory 12d. Therefore, a high-performance light source device wherein the light intensity is stable from the beginning of emitting can be easily achieved.

In this embodiment, the light source device 11 emits light in order of: e.g., red, green and blue, and repeats the above process until the control signal LOUT is negated (becomes "L").

When each of the LD-drive current LDD1 to LDD4 becomes "H", the LD drive units 12e1 to 12e4 drive the LDs connected respectively by applying the current IL1 to IL4. Now, fifteen LDs shown in FIG. 2 are divided into groups (see FIG. 5) by every $2^n$ (n=1 to 4) and respectively connected to one of a corresponding LD-drive unit 12e1 to 12e4.

Here, a complete suspension period of emission, namely, the period in which all the LDs 13a are turned off, is arranged between each colored emission from the LDs (time periods T5 in FIG. 7). The purpose of the suspension period is to prevent the simultaneous emission of the two colored lights at each border of the areas A to C (15ba to 15bc, see FIG. 3) due to a spot diameter of the LD-light emitted to the wheel 15b having a given size. As a result, an advantageous effect of keeping chromatic purity of the LD-lights as the source lights is possible.

However, because the LDs themselves and the fluorescent body are cooled while the LDs 13a are turned off, a temperature-rise gradient of the LDs and the fluorescent body is generated again the next time the LDs 13a are turned on. Thus, the amount of luminescence of the LDs or the fluorescent body varies depending on the temperature characteristics of the LDs or the fluorescent body for the duration of light-emitting periods (time periods T2, T3 or T4 in FIG. 7) if the number of the LDs emitting light is constant.

Figure 8:
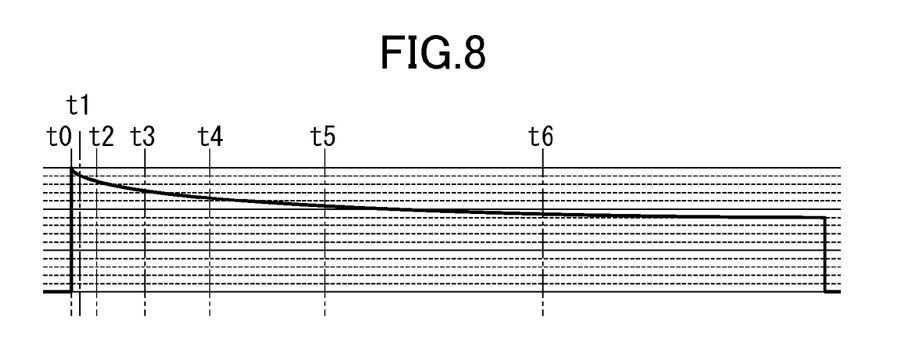
FIG. 8 is a graph illustrating an example of the output characteristics of the emitted light whilst keeping the number of the LDs which emit light at a constant level during a time period T2, T3, or T4 shown in FIG. 7.

FIG. 8 illustrates an example of the output characteristics of emission when the number of the LDs emitting light is constant for the duration of the time periods T2, T3 or T4 in FIG. 7. That is to say, the LDs and the fluorescent body have a high light-emitting efficiency right after the LDs start emitting because they are still cold, and hence have the highest light-emitting amount. Then, the amount of luminescence of the light source decreases as the luminescence efficiency gradually decreases with rising temperature of the LDs and the fluorescent body. And when the temperature of the LDs and the fluorescent body becomes stable, the amount of luminescence of the light source becomes constant.

Figure 9:
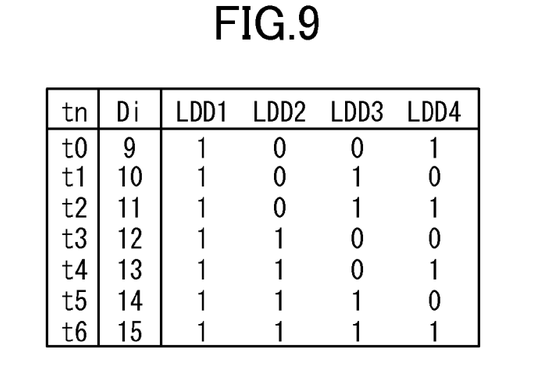
FIG. 9 illustrates the control information to be stored in the memory 12d shown in FIG. 4.
Figure 10:
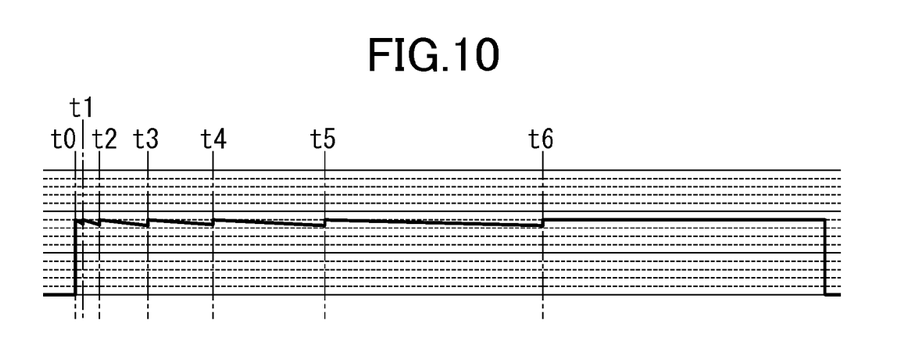
FIG. 10 is a graph illustrating that the amount of luminescence emitted by the LD module 13 is kept at a constant level.

Therefore, the control information, for example, as shown in FIG. 9, is previously stored in the memory 12d. The processing device 12b executes the read processing of the control information from the memory 12d based on the method described above with a precise timing and controls on/off of the LD-drive current IL1 to IL4 by use of the processed information. Consequently, it is possible to control the amount of luminescence substantially constant as shown in FIG. 10 (See the waveform of Fnld shown in FIG. 7. This waveform shows the number of the driven LD in a characteristic curve).

In this way, it is possible to maintain the amount of luminescence of a light source constant in order to simplify a configuration of the device and achieve the proper gradation expression of an image. Consequently, a low-cost and high-performance light source device without requiring a high-speed driving circuit can be achieved.

<Second Embodiment>

Figure 11:
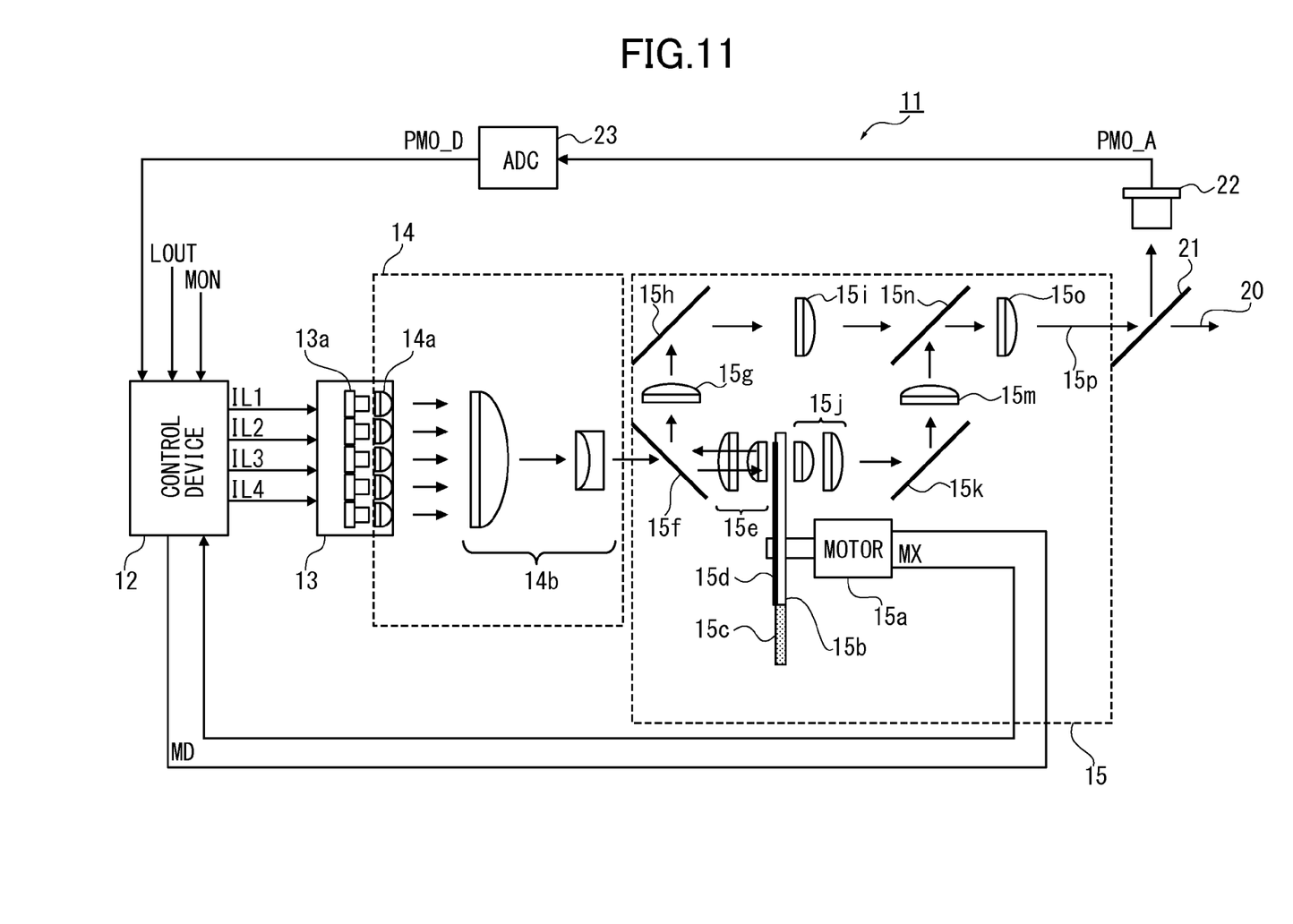
FIG. 11 is a schematic view of the configuration of the light source device according to the second embodiment of the invention.

FIG. 11 is a schematic view of a configuration of a light source device according to a second embodiment of the present invention wherein the same reference numbers are attached to similar parts to the first embodiment shown in FIG. 1 and descriptions thereof are omitted. Further, FIG. 12 illustrates an example of the configuration of the control unit shown in FIG. 11 wherein the same reference numbers are attached to similar parts to the first embodiment shown in FIG. 4 and descriptions thereof are omitted.

First, the light source device in FIG. 11 is configured as follows: a partially-reflecting mirror 21 is installed after the collecting lens system 15o and the part of the emitted source light 15p is reflected by a partially-reflecting mirror 21 and led to the PMD (Power Monitor Device) 22. Then, a part of source light led to PMD 22 is outputted with conversion into an analog electrical signal PMO_A and entered to the control device 12 with conversion into a digital light signal PMO_D by ADC (Analog-Digital Converter) 23.

Figure 12:
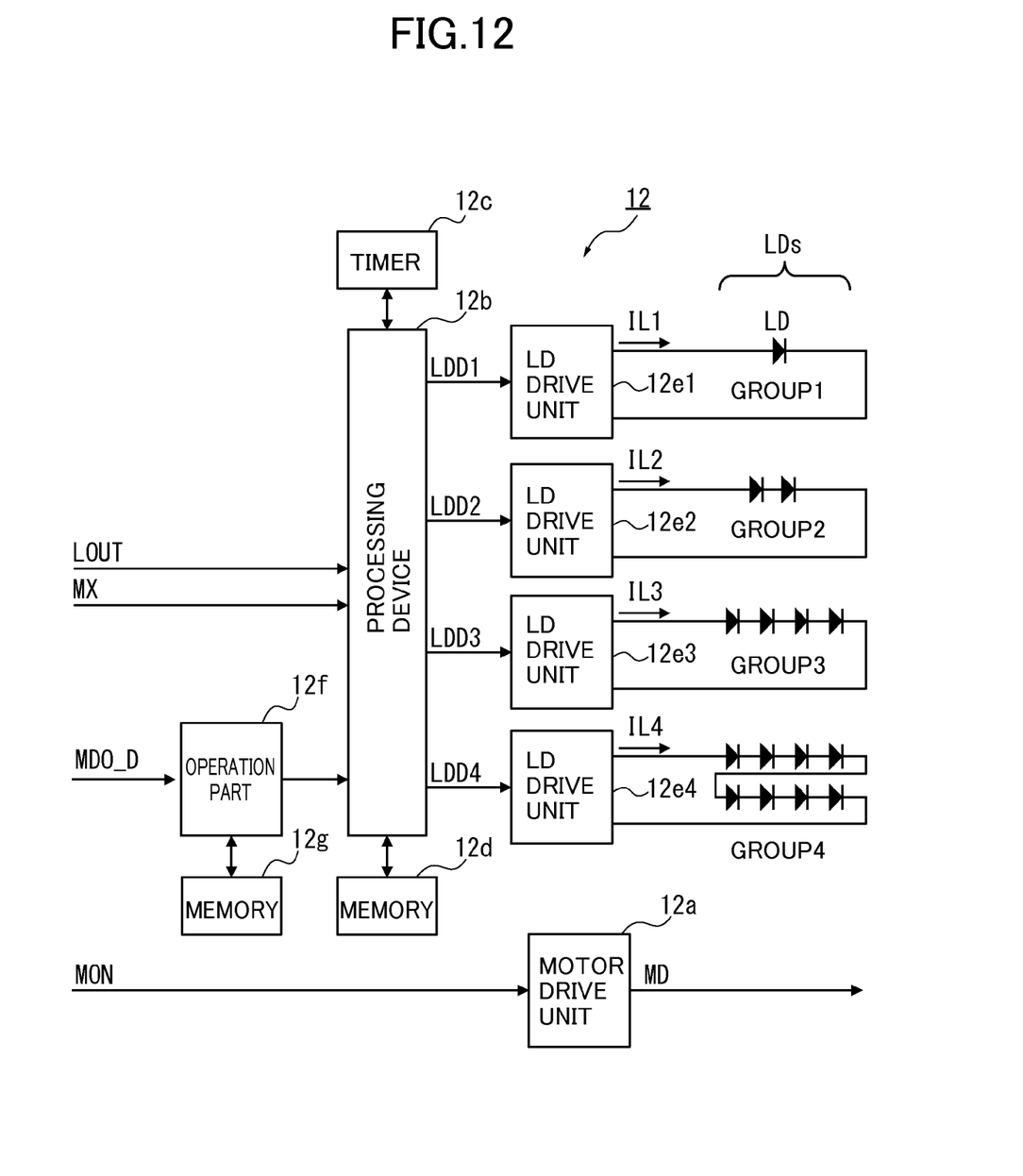
FIG. 12 illustrates an example of the configuration of the control device 12 and an example of the wiring of the LD mounted on the LD module 13 shown in FIG. 11.

Secondly, the light source device in FIG. 12 includes an operation part 12f and a memory 12g attached to the operation part 12f. The operation part 12f loads the digital-converted light signal data PMO_D sequentially and stores the data in the memory 12g at first.

Then, the operation part 12f stores light signal data for a period of time TO in the memory 12g. Next, the operation part 12f leads the light signal data sequentially from the memory 12g and calculates a difference value between the data and a reference data set individually for each color.

Then, if the difference value is beyond a predetermined range, the operation part 12f produces modified data from the LD-driving data and outputs the data as the modified control information to the processing device 12b after combining with elapsed time data Dt.

Once the modified control information is received from the operation part 12f, the processing device 12b updates the memory 12d with the information.

In this way, the light source device includes a light intensity detection device for detecting the amount of luminescence of the source light and can update the control information based on the detection result. Therefore, a light source device constantly emitting the intended amount of luminescence by adjustment of a luminescence property if it changes with time can be achieved.

<Third Embodiment>

Figure 13:
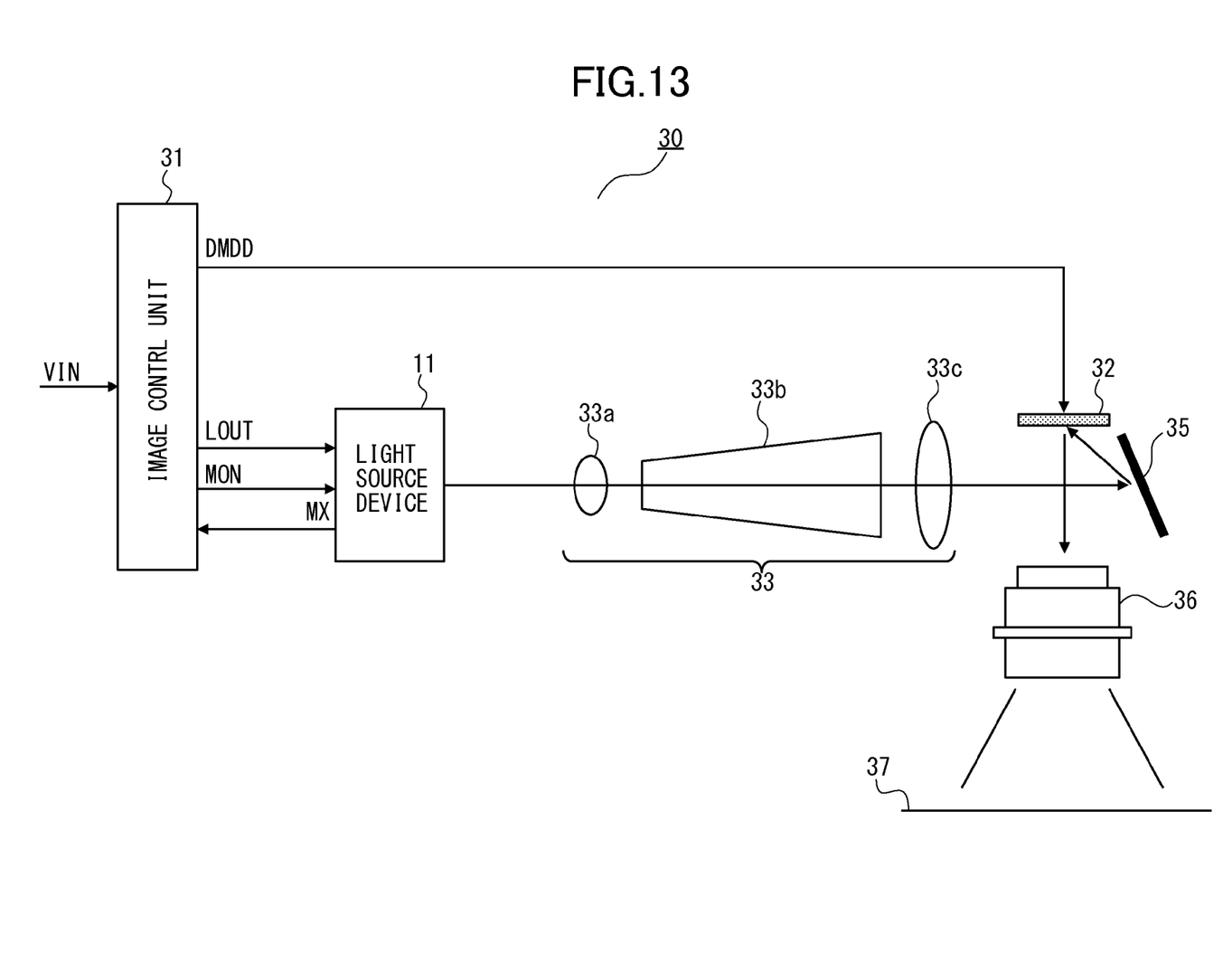
FIG. 13 illustrates a schematic configuration of the projector according to the third embodiment of the invention.

FIG. 13 illustrates a schematic configuration of the projector according to the third embodiment of the present invention.

As shown in FIG. 13, the projector 30 includes an image control unit 31, the light source device 11, a DMD (Digital Micromirror Device) 32, an illumination optical system 33, a reflecting mirror 35, and a projection optical system 36.

In FIG. 13, the light source device 11 is the light source device shown in FIG. 1 or FIG. 11, and emits light in the red, green, and blue wavelength bands sequentially on a time-division basis.

In addition to the configuration above, at least one other light source device (not shown) can be used along with the light source device 11.

Once the image control unit 31 receives an external video signal VIN, it rotates the wheel 15b by driving the motor 15a in the light source device 11 by making the control signal MON to "H" from a frame frequency of the signal. Then, once it is detected that the motor drive unit 12a has reached a predetermined revolution speed from the index signal MX, the image control unit 31 starts emitting the source light by making the control signal LOUT "L" to "H"

Further, the image control unit 31 produces display signals corresponding to each color from a video signal VIN, and additionally outputs the signals that are converted into a driving signal DMDD that drives a display element DMD 32.

On the other hand, the source light emitted from the light source device 11 is led to a rod integrator 33b after being collected by a collecting lens system 33a. Then, the source light emitted from the rod integrator 33b is emitted to a display element area of the DMD 32 by an illuminating lens 33c and the reflecting mirror 35.

The illuminating light entering the DMD 32 is modulated to display signal image light by the signals DMDD corresponding to each color entered in synchronization. Additionally, the display signal image light is projected to a screen 37 and so on after passing through the projection optical system 36 and images are displayed thereon.

In this way, the light source device emits the light from the plurality of small light sources and the luminescence from the fluorescent body, switching from one to another on the time-division basis. Therefore, a light source device that is capable of emitting light of the plurality of wavelength bands can be achieved in a compact and low-cost way. A projector that is easy to use, environmentally friendly since it does not use mercury, and having a capability of high-quality gradation expression can be achieved by use of the light source device according to the present embodiment as a light source of a projector that is capable of gradation expression by PWM driving. been described, it should be understood that the present invention is not limited to these embodiments, various modifications and changes can be made to the embodiments by those skilled in the art as long as such modifications and changes are within the scope of the present invention as defined by the Claims.

What is claimed is:

1. A light source device, comprising:
   a plurality of small light sources;
   a light source control device configured to selectively control on/off of emissions from the plurality of small light sources;
   a first optical system configured to collect the light emitted from the small light sources into one collected light; and
   a second optical system configured to emit the collected light as source light, directly or with an optical-processing,
   wherein the light source control device is configured to control an amount of emission of the source light by controlling a number of the small light sources that are selectively turned on, and wherein the light source control device is configured to control the number of small light sources selected to emit light based on an elapsed time of a timer.

2. A light source device according to claim 1, wherein the small light sources are laser diodes or light-emitting diodes.

3. A light source device according to claim 2, wherein the second optical system includes a diffusion member configured to reduce directionality of the collected light and emit the collected light whose directionality is reduced as the source light.

4. A light source device according to claim 2, wherein the second optical system includes a fluorescent body configured to emit light of a different wavelength band from irradiated light of the collected light and emit light of the different wavelength band as the source light.

5. A projection device, comprising:
the source device according to claim 1;
a display element configured to produce image light by modulation from irradiated light based on an incoming display video signal;
an illumination optical system configured to collect the source light into a desired plane and irradiate the display element with the collected light;
a projection optical system configured to project the image light produced by the display element onto a screen; and
a display control device configured to switch the wavelength band of the source light emitted from the light source device on a time-division basis, while inputting the video signal, and control the display element by producing the display video signal in synchronization with the wavelength band of the source light emitted from the light source device.

6. A projection device, comprising:
the light source device according to claim 1;
at least one other light source device configured to emit light of a different wavelength band from the source light;
a display element configured to produce image light by modulation from irradiated light based on an incoming display video signal;
an illumination optical system configured to collect the source light and light from at least one other light source device into a desired plane and irradiate the display element with the collected light;
a projection optical system configured to project the image light produced by the display element onto a screen; and
a display control device configured to switch the emission of the source light emitted from the each light source device on a time-division basis, while inputting the video signal, and control the display element by producing the display video signal corresponding to each wavelength band in synchronization with the source light emitted from the each light source device.

7. A light source device according to claim 1, wherein the light source control device is configured to control the number of small light sources selected to emit light based on the elapsed time of the timer and sets of control information, each set of control information including elapsed time data and driving data.

8. A light source device according to claim 1, wherein the light source control device is configured control the number of small light sources selected to emit light by,
reading a first set of the sets of control information that has a desired value of elapsed time data,
storing the read first set of control information in a register, and
controlling the number of small light sources selected to emit light based on a comparison of the elapsed time data and the elapsed time of the timer.

9. A light source device according to claim 1, wherein if the comparison indicates that elapsed time data does not coincide with the elapsed time of the timer, the light source control device is configured to control the number small light sources selected to emit light based on driving data of a second set of the sets of control information, the second set of control information having a lower value of elapsed time data than the first set of control information.

10. A light source device according to claim 1, wherein if the comparison the elapsed time data coincides with the elapsed time of the timer, the light source control device is configured to control the number small light sources selected to emit light based on driving data of the first set of control information stored in the register.

11. A light source device, comprising:
a plurality of small light sources;
a light source control device configured to selectively control on/off of emissions from the plurality of small light sources;
a first optical system configured to collect the light emitted small light sources into one collected light; and
a second optical system configured to emit the collected light as source light, directly or with an optical-processing,
wherein the light source control device is configured to control an amount of emission of the source light by controlling a number of the small light sources that are selectively turned on,
wherein the small light sources are laser diodes or light-emitting diodes,
wherein the second optical system includes a fluorescent body configured to emit light of a different wavelength band from irradiated light of the collected light and emit light of the different wavelength band as the source light, and
wherein the second optical system includes a light-switching device configured to repeat, in a cycle, a first period to emit the collected light as the source light directly or after passing through a diffusion member and a second period to emit the light produced by irradiating with the collected light to the fluorescent member as the source light.

* * * * *